United States Patent [19]
Auer et al.

[11] Patent Number: 6,007,934
[45] Date of Patent: Dec. 28, 1999

[54] CO-TOLERANT ANODE CATALYST FOR PEM FUEL CELLS AND A PROCESS FOR ITS PREPARATION

[75] Inventors: Emmanuel Auer, Frankfurt; Andreas Freund, Kleinostheim; Thomas Lehmann, Langenselbold; Karl-Anton Starz; Robert Schwarz, both of Rodenbach; Udo Stenke, Mainaschaff, all of Germany

[73] Assignee: Degussa Aktiengesellschaft, Frankfurt, Germany

[21] Appl. No.: 09/080,468

[22] Filed: May 19, 1998

[30] Foreign Application Priority Data

May 21, 1997 [DE] Germany .......................... 197 21 437

[51] Int. Cl.$^6$ .................................................. H01M 4/86
[52] U.S. Cl. ................................ 429/44; 429/40; 429/41; 429/42; 429/30; 429/33; 204/282; 204/283; 204/290 F; 502/101

[58] Field of Search .................................. 429/40, 41, 44, 429/42, 30, 33; 204/290 F, 282, 283; 502/101

[56] References Cited

U.S. PATENT DOCUMENTS

| | | | |
|---|---|---|---|
| 5,786,026 | 7/1998 | Seko et al. | 204/290 F |
| 5,795,669 | 8/1998 | Wilkinson et al. | 204/290 F |
| 5,795,672 | 8/1998 | Dearnaley | 429/40 |
| 5,856,036 | 1/1999 | Smotkin et al. | 429/40 |
| 5,861,222 | 1/1999 | Fischer et al. | 429/41 |

*Primary Examiner*—Bruce F. Bell
*Attorney, Agent, or Firm*—Smith, Gambrell & Russell, LLP

[57] ABSTRACT

A platinum supported catalyst is disclosed for the anode in a PEM fuel cell with high resistance to poisoning by carbon monoxide. The catalyst contains the noble metals platinum and ruthenium on a finely divided, conductive support material. The two noble metals are not alloyed with each other and are present in highly dispersed form on the support material, wherein the crystallite size of the platinum is less than 2 nm and that of the ruthenium is less than 1 nm.

10 Claims, 1 Drawing Sheet

CO-TOLERANT ANODE CATALYST FOR PEM FUEL CELLS AND A PROCESS FOR ITS PREPARATION

INTRODUCTION AND BACKGROUND

The present invention relates to a platinum supported catalyst for the anode of a PEM fuel cell with high resistance to poisoning by carbon monoxide. The catalyst contains the noble metals platinum and ruthenium on a finely divided, conductive support material. It is particularly suitable for use as an anode catalyst in fuel cells with a polymer electrolyte membrane.

Fuel cells are in principle gas-operated batteries, in which the energy obtained from the reaction of hydrogen and oxygen is converted directly into electrical energy. The present invention describes the preparation of catalysts for fuel cells, in particular the preparation of supported catalysts based on platinum and platinum alloys for PEM fuel cells (PEM=polymer electrode membrane). This type of fuel cell is becoming increasingly important, due to its high energy density and robust structure, for use in the vehicle industry, i.e. for providing electro-traction in motor vehicles.

The advantages of a car running on fuel cells are the very low emissions and the high degree of efficiency as compared with conventional internal combustion engines. If hydrogen is used as the fuel gas, water is produced as the only emission on the cathode side of the cell. The vehicle is then a so-called ZEV (zero emission vehicle). However, hydrogen is still too expensive at the moment and there are problems with the storage and refuelling of vehicles. For this reason the alternative, producing hydrogen directly on board the vehicle by reforming methanol is growing in importance. The methanol stored in the vehicle fuel tank is converted in a steam reforming process at 200 to 300° C. to a hydrogen-rich fuel gas with carbon dioxide and carbon monoxide as secondary constituents. After converting the carbon monoxide by a shift reaction, preferential oxidation (PROX) or another purification process, this fuel gas is supplied directly to the anode side of the PEM fuel cell. Theoretically the reformate gas consists of 75 vol. % hydrogen and 25 vol. % carbon dioxide. In practice, however, this gas also contains nitrogen, oxygen and, depending on the degree of purity, varying amounts of carbon monoxide (up to 1 vol. %).

Supported catalysts based on platinum and platinum alloys are used as catalysts on the anode and cathode sides of PEM fuel cells. These consist of fine, noble metal particles which are deposited onto a conductive support material (generally carbon black or graphite). The concentration of noble metal is between 10 and 40 wt. %, the proportion of conductive support material is thus between 60 and 90 wt. %. The crystallite size of the particles, determined by X-ray diffraction (XRD), is about 2 to 10 nm.

Traditional platinum catalysts are very sensitive to poisoning by carbon monoxide, therefore the CO content of the fuel gas must be lowered to <10 ppm in order to prevent power loss in the fuel cells due to poisoning of the anode catalyst. This applies in particular to a PEM fuel cell which is especially sensitive to CO poisoning as a result of its low operating temperatures of 70 to 100° C.

The present invention is concerned with the preparation of supported catalysts based on platinum and ruthenium which have a high resistance to poisoning by carbon monoxide. CO concentrations of more than 100 ppm in the reformate gas should be possible and should not lead to a noticeable drop in performance of the PEM fuel cell. As a result of using this new type of catalyst on the anode side of the PEM fuel cell the number of process steps to remove carbon monoxide from the fuel gas is reduced. This leads to a considerable decrease in the cost of the system, to an improvement in the efficiency of the system and to a reduction in the size of the overall system. The new catalysts are therefore of great significance with regard to introducing PEM fuel cells into the vehicle industry.

The problem of poisoning of platinum catalysts by carbon monoxide has been recognized for a very long time. CO is adsorbed at the surface of the platinum due to its special molecular structure and thus blocks the access of hydrogen molecules in the fuel gas to the catalytically active platinum centers.

Adsorbed carbon monoxide can be oxidized to carbon dioxide by adding water and can then be removed from the catalyst surface. It is also known that the tolerance of platinum to poisoning by carbon monoxide is improved by alloying or doping the platinum with ruthenium.

L. W. Niedrach et. al. (J. Electrochemical Techn. 5, 1967, page 318) describe the use of Pt/Ru catalysts as CO-tolerant anode catalysts for sulphuric acid fuel cells. These materials consist of fine Pt/Ru alloy powders with high specific surface areas. They are prepared by the so-called ADAMS process from a molten material consisting of platinum chloride, ruthenium and sodium nitrate at 500° C. As a result of the high temperatures during preparation, these catalysts are present as Pt/Ru alloys. The materials are not fixed on a support and are therefore not supported catalysts. Also no information is provided relating to their use in PEM fuel cells.

Pt/Ru supported catalysts have also been available commercially for some time. Thus ETEK Inc., Natick, Mass. (USA) offers corresponding materials for use as anode catalysts in PEM fuel cells.

The catalysts in this case are Pt/Ru alloy catalysts with noble metal concentrations between 5 and 40 wt. % and a Pt/Ru atomic ratio of 1:1. This catalyst has a uniform alloy phase, detectable by XRD. However, it demonstrates unsatisfactory tolerance to carbon monoxide, in particular at concentrations of carbon monoxide of more than 100 ppm and with residual oxygen in the fuel gas.

In a recent paper, M. Iwase and S. Kawatsu report on the production of a CO-tolerant anode catalyst (M. Iwase and S. Kawatsu, Electrochemical Society Proceedings, Vol. 95–23, page 12). In this paper the best results were produced with a Pt/Ru alloy catalyst which was prepared via a special annealing process for producing an alloy. However, the voltage drop with a current density of 0.4 amps/cm$^2$, at a CO concentration of 100 ppm, is still about 200 mV. This is still too high for practical use. With an unalloyed Pt/Ru system, on the other hand, still poorer results were obtained so it can be assumed from these data that only alloyed Pt/Ru supported catalysts produce the best results for CO-tolerance in a PEM fuel cell.

An object of the present invention is to provide supported catalysts which have an improved tolerance to carbon monoxide, in particular at concentrations of more than 100 ppm. Another object of the present invention is to provide catalysts suitable for use with carbon monoxide, nitrogen and oxygen-containing fuel gases that exhibit the lowest possible voltage drop with high current densities.

SUMMARY OF THE INVENTION

The above and other objects of the invention are achieved by a platinum supported catalyst for the anode of a PEM fuel cell with high resistance to poisoning by carbon monoxide, containing the noble metals platinum and ruthenium on a finely divided, conductive support material. It is a feature of the invention that in the catalyst of the invention, the two noble metals are not alloyed with each other. Rather, they are present in a highly dispersed form on the support material, wherein the crystallite size of the platinum is less than 2 nm and that of the ruthenium is less than 1 nm.

Surprisingly, it has been shown that these non-alloyed Pt/Ru supported catalysts according to the invention which are prepared by a special process which suppresses alloy formation have a very good CO tolerance for concentrations up to 150 ppm of CO.

The reasons for the improved CO-tolerance of the catalyst have still not been fully explained. One possible explanation is that the rate-determining step for CO oxidation is not the reaction with oxygen on the Ru surface but the diffusion of CO to the catalyst surface. If the distance between the Pt and Ru crystallites is small, that is the two metals are very highly dispersed, the diffusion of CO can take place rapidly. The oxidation properties of the catalyst are therefore greatly improved.

When an alloy is formed between the two metals, they exchange lattice positions and this means that some of the ruthenium is no longer present at the surface of the particles.

The process for preparing Pt/Ru supported catalysts according to the invention is specifically aimed at preventing alloy production with the noble metals and at the same time producing a fine dispersion.

To deposit platinum and ruthenium on the support material, it is first suspended in water. Aqueous solutions of precursor compounds of the noble metals platinum and/or ruthenium are added to this suspension and the pH of the suspension consisting of support material and noble metal solution is adjusted to a value from 7 to 9 by adding an alkaline solution. In addition the temperature of the suspension is raised to a constant value from 50 to 80° C. before or after adding the noble metal compounds. Then all of the platinum and/or ruthenium is deposited onto the support material by reducing with a reducing agent. The catalyst obtained in this way is filtered, washed and dried.

A high temperature annealing process, such as is used to produce alloys, is avoided. Vacuum drying at temperatures of up to a maximum of 200° C. has proven beneficial as an annealing and drying process.

BRIEF DESCRIPTION OF DRAWINGS

The present invention will be further understood with reference to the accompanying drawings, wherein.

DETAILED DESCRIPTION OF INVENTION

Further details of the present invention will now be described.

The two noble metals may be deposited onto the support material either simultaneously or in any sequence one after the other. If a sequential deposition procedure is selected, then the second noble metal is deposited onto the support material in the same way as the first noble metal before drying the catalyst.

A reducing agent which contains an aldehyde group such as formaldehyde or sodium formate is preferably used as reducing agent.

Conductive support materials which may be used include carbon black, graphitized carbon black, graphite or active carbon with specific surface areas (BET) of about 40 to 1500 $m^2/g$. Deposition of the noble metals from aqueous solution takes place by chemical reduction of the corresponding platinum and ruthenium salts. Chlorine-containing starting compounds such as hexachloroplatinic acid and ruthenium chloride or chlorine-free compounds, e.g. platinum nitrate, platinum bisulphite or ruthenium nitrosyl nitrate may be used. In general water soluble inorganic salts of the noble metals are used. The proportion of platinum and ruthenium is between 10 and 40 wt. %, that of the conductive support material between 60 and 90 wt. %. The atomic ratio of platinum to ruthenium is between 1:4 and 4:1, preferably between 1:1 and 2:1.

The catalyst according to the invention may be used to produce a variety of components for PEM fuel cells.

Figure 1:
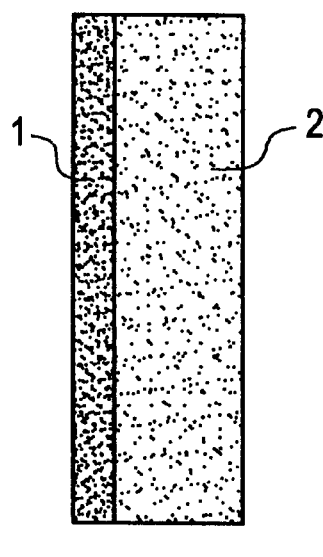
FIG. 1 is a schematic representation of a gas diffusion electrode consisting of a porous catalyst layer on a water-repellent, conductive substrate material.

FIG. 1 shows a so-called gas diffusion electrode which contains the catalyst. This electrode consists of a water-repellent, conductive substrate material (2) (for example water-repellent carbon paper), on which a porous layer of catalyst (1) is applied.

Figure 3:
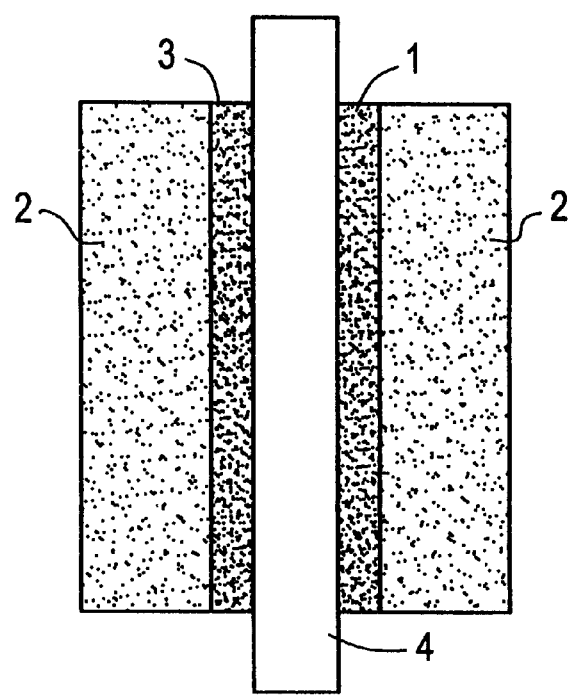
FIG. 3 is a schematic representation of a membrane-electrode unit for PEM fuel cells.

Using these gas diffusion electrodes, membrane electrode units for PEM fuel cells as depicted in FIG. 3 can be constructed in which both sides of the polymer membrane (4) are placed in contact with these types of gas diffusion electrodes. On the anode side, a gas diffusion electrode which contains a catalyst according to the invention (1) is used. On the cathode side a gas diffusion electrode with cathode catalyst (3) is attached to the membrane.

Figure 2:
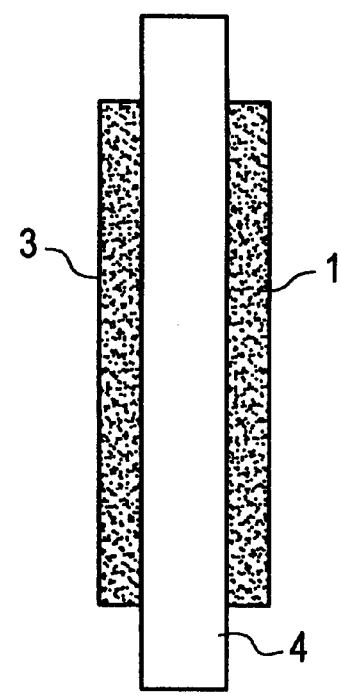
FIG. 2 is a schematic representation of a proton conducting polymer membrane coated with catalyst layers.

As an alternative, the polymer membrane may be coated with gas diffusion electrodes as shown in FIG. 2 without the intermediate step involving producing a separate gas diffusion electrode. In a first step both sides of the polymer membrane (4) are provided with catalyst layers (1, 3), one of which contains the anode catalyst (1) according to the invention. A complete membrane electrode unit is then produced by placing the catalyst layers in contact with water-repellent carbon paper.

Catalysts according to the invention in the following examples were characterized by means of X-ray spectroscopy (XRD) and analysis. Then they were processed to produce a gas diffusion electrode and a membrane electrode unit (MEU), wherein the catalysts were used on the anode side of the MEU.

The CO-tolerance was determined in a PEM fuel cell with a cell area of 25 $cm^2$. A simulated methanol reformate gas with the composition 50–60 vol. % hydrogen, 10–15 vol. % nitrogen, 20–25 vol. % carbon dioxide and 0–5 vol. % oxygen was used as anode fuel gas. The voltage drop $\Delta U$ (mV) which occurred after the addition of a specific amount of CO represented a measure of the CO-tolerance of the catalyst. The smaller this voltage drop, the better the CO-tolerance of the catalyst. Catalysts according to the invention generally have $\Delta U$ values which are up to 50 % better than the comparable values of the commercially available catalysts.

The following examples are intended to explain the invention in more detail.

EXAMPLE 1

Pt/Ru supported catalyst according to the invention.

A solution of 52.7 g of hexachloroplatinic acid (25 wt. % Pt) and 48.4 g of ruthenium(III) chloride solution (14 wt. % Ru) in 200 ml of deionized water was added to a suspension of 81.1 g of carbon black, Vulcan XC72 (residual moisture content 1.39 wt. %) in 2000 ml of deionized water, over the course of 10 minutes with vigorous stirring at room temperature. The mixture was heated to 80° C. and the pH adjusted to 8.5 with caustic soda solution. After adding 27.2 ml of an aqueous formaldehyde solution (37 wt. %) the mixture was filtered, the moist filter cake was washed with 2000 ml of deionized water and dried at 80° C. in a vacuum drying cabinet.

The analytical data for the catalyst are:

Pt content: 13.18 wt. %

Ru content: 6.82 wt. %

Atomic ratio Pt/Ru: 1:1

The catalyst was characterized using XRD. The (110) reflection for platinum was obtained at about 2θ=40°. A shift in the reflection which could indicate alloy production could not be detected. On the other hand, the (111) reflection from ruthenium at 2θ=44° was clearly visible.

The crystallite size of the platinum was about 1.5 nm, that of ruthenium below 1 nm.

The catalyst was processed to give an ink using a solution of NAFIONO and applied in this form to a conductive water-repellent carbon paper (TORAY Co, TGC 90). The coating contained 0.16 mg of noble metal per cm². The anode prepared in this way was hot-pressed together with an ion-conductive membrane (Nafion® 117) and a cathode electrode (coating 0.3 mg Pt/cm²) to produce a membrane electrode unit (MEU).

The measurements were performed in a PEM single cell (no pressure applied, temperature 75° C.), using a current density of 0.5 amps/cm².

The voltage drop $\Delta U$ which occurred after adding 100 or 120 ppm of CO to the fuel gas was used as a measure of the CO-tolerance of the catalyst.
Results:

| | |
|---|---|
| Fuel gas composition: | 58 vol. % H₂; 15 vol. % N₂ |
| | 24 vol. % CO₂, 3 vol. % O₂ |
| CO concentration: | 100 ppm |
| Voltage drop (ΔU) | 41 mV |
| CO concentration: | 120 ppm |
| Voltage drop (ΔU) | 72 mV |

The values for the voltage drop $\Delta U$ were lower than for the comparison catalyst in comparison example 1 by a factor of about 2. This demonstrates the improved CO-tolerance of the catalyst.

EXAMPLE 2

Pt/Ru supported catalyst according to the invention.

A solution of 43.2 g of platinum nitrate (30.5 wt. % Pt) and 34.1 g of ruthenium nitrosyl nitrate solution (20 wt. % Ru) in 200 ml of deionized water was added to a suspension of 80.6 g of Vulcan XC72 (residual moisture 0.8 wt. %) in 2000 ml of deionized water, at room temperature over the course of 10 minutes with vigorous stirring. The mixture was heated to 80° C. and the pH adjusted to 8.5 with caustic soda solution. After adding 27.2 ml of an aqueous formaldehyde solution (37 wt. %) the mixture was filtered, the moist filter cake was washed with 2000 ml of deionized water and the catalyst was dried at 100° C. under vacuum.

Analytical data:

| | |
|---|---|
| Pt content: | 13.18 wt. % |
| Ru content: | 6.82 wt. % |
| Atomic ratio Pt/Ru: | 1:1 |
| Pt crystallite size (XRD) | <1.5 nm |
| Ru crystallite size (XRD) | <1 nm |

Here again X-ray analysis of the catalyst demonstrated the presence of a non-alloyed system.

The catalyst is processed to give a gas diffusion electrode and a membrane electrode unit in the same way as described in example 1 and measurements were made in a PEM fuel cell under identical conditions. The composition of the fuel gas was the same as in example 1.
Results:

| | |
|---|---|
| CO concentration: | 100 ppm |
| Voltage drop (ΔU) | 40 mV |
| CO concentration: | 120 ppm |
| Voltage drop (ΔU) | 67 mV |

This also demonstrates the improved CO-tolerance of the catalyst according to the invention as compared with comparison example 1.

EXAMPLE 3

Pt/Ru supported catalyst according to the invention.

A solution of 26.5 g of platinum nitrate solution (30 wt. %) in 100 ml of deionized water was added to a suspension of 40.65 g of Vulcan XC72 (residual moisture 1.6 wt. %) in 1500 ml of deionized water at 80° C. and the pH was then adjusted to 8 with caustic soda solution. After adding 10.8 ml of an aqueous formaldehyde solution (37 wt. %) the mixture was filtered and the moist filter cake was washed with 3000 ml of deionized water.

The moist catalyst was then again suspended in 1000 ml of deionized water and 30 g of ruthenium nitrosyl nitrate solution (6.86 wt. % Ru) in 100 ml of deionized water were added thereto. After heating to 80° C. the pH was adjusted to 7 using caustic soda solution. After reaction the mixture was filtered and the moist filter cake was washed with 1000 ml of deionised water and dried under vacuum at 80° C.
Analytical data:

| | |
|---|---|
| Pt content: | 15.9 wt. % |
| Ru content: | 4.1 wt. % |
| Atomic ratio Pt/Ru: | 2:1 |
| Pt crystallite size (XRD) | <1.8 nm |
| Ru crystallite size (XRD) | <1 nm |

The X-ray analysis demonstrated the presence of a non-alloyed Pt/Ru system. The catalyst was processed to produce an MEU as in the previous examples and tested for CO-tolerance in a PEM fuel cell.
Results:

| | |
|---|---|
| CO concentration: | 100 ppm |
| Voltage drop (ΔU) | 45 mV |
| CO concentration: | 120 ppm |
| Voltage drop (ΔU) | 89 mV |

Here again the improved CO-tolerance as compared with comparison example 1 is demonstrated.

COMPARISON EXAMPLE 1

A commercially available Pt/Ru supported catalyst (noble metal content 20 wt. %, Pt/Ru atomic ratio 1:1) was used in the comparison tests. It represents the prior art for this sector.

X-ray analysis (XRD) of this material clearly demonstrated the presence of an alloyed Pt/Ru system. A shift in the Pt (111) reflection was obtained which indicated a solid solution of Ru in Pt, corresponding reflections from pure Ru not being present. The crystallite size (XRD) of the Pt/Ru crystallites was 2.7 nm.

The catalyst was processed to give an ink using a solution of NAFION® and applied in this form to a conductive, water-repellent carbon paper. The coating amounted to 0.18 mg of noble metal/cm2.

Then this electrode, as anode, was compressed together with an ion-conductive membrane (NAFIONO 117) and a cathode electrode (coating 0.3 mg Pt/cm$^2$) to produce a membrane electrode unit (MEU). Measurements were determined in a PEM single cell (no pressure applied, temperature 75° C.), using a current density of 0.5 amps/cm$^2$.
Results:

| Fuel gas composition: | 57 vol. % $H_2$; 15 vol. % $N_2$ |
| --- | --- |
| | 25 vol. % $CO_2$, 3 vol. % $O_2$ |
| CO concentration: | 100 ppm |
| Voltage drop (ΔU) | 80 mV |
| CO concentration: | 120 ppm |
| Voltage drop (ΔU) | 128 mV |

The values for the voltage drop when adding CO were greater by a factor of about 2 than the values obtained for the catalysts according to the invention. The superiority of the new catalysts is demonstrated in particular at CO concentrations of more than 100 ppm.

Further variations and modifications will be apparent to those skilled in the art from the foregoing and are intended to be encompassed by the claims appended hereto.

German priority application 197 21 437.1 is relied on and incorporated herein by reference.

We claim:

1. A platinum supported catalyst for the anode of a PEM fuel cell with high resistance to poisoning by carbon monoxide, comprising the noble metals platinum and ruthenium deposited on a finely divided, conductive support material, said noble metals being not alloyed with each other and being present in highly dispersed form on the support material, wherein the platinum has a crystallite size of less than 2 nm and the crystallite size of the ruthenium is less than 1 nm.

2. The supported catalyst according to claim 1, wherein the atomic ratio of platinum to ruthenium is from 1:4 to 4:1.

3. The supported catalyst according to claim 1, wherein the conductive support material is a member selected from the group consisting of carbon black, graphitized and carbon black, graphite and active carbon.

4. The supported catalyst according to claim 1, wherein the platinum and ruthenium are present in an amount of from 10 to 40 wt. %, and the conductive support material is present from 60 to 90 wt. %.

5. A process for preparing a supported catalyst according to claim 1, comprising suspending an electrically conductive support material in water to form a suspension of said support material, adding an aqueous solution of a soluble compound of the noble metals platinum and/or ruthenium to the suspension, raising the pH of the suspension to 7 to 9 by adding an alkaline solution, depositing all of the platinum and/or ruthenium onto the support material by adding a reducing agent, to thereby obtain a reduced catalyst, filtering the catalyst obtained in this way, washing and optionally depositing a second noble metal which is platinum and/or ruthenium and drying the platinum/ruthenium catalyst at a temperature of not more than 200° C.

6. The process according to claim 5, wherein the temperature of the suspension, before or after addition of the noble metal compounds, is raised to a constant temperature from 50 to 80° C. and deposition of the noble metals onto the support material is performed at this temperature.

7. The process according to claim 6, wherein an aldehyde group-containing reducing agent is added.

8. A gas diffusion electrode for the anode side of a PEM fuel cell comprising a porous catalyst layer on a water-repellent, conductive substrate, wherein said layer is the platinum supported catalyst according to claim 1.

9. A hydrogen ion-conducting, polymer membrane for PEM fuel cells coated with a catalyst, wherein a catalyst layer on an anode side contains the platinum supported catalyst according to claim 1.

10. A membrane electrode unit for a PEM fuel cell which, contains a hydrogen ion-conducting, polymer membrane and has gas diffusion electrodes applied to both the cathode and anode sides, wherein there is present a catalyst layer on the anode side which is the platinum supported catalyst according to claim 1.

* * * * *